United States Patent [19]

Feldman et al.

[11] Patent Number: 5,584,700

[45] Date of Patent: Dec. 17, 1996

[54] VIRTUAL-REALITY BASED FLYCYCLE EXERCISE MACHINE

[75] Inventors: Philip G. Feldman, Baltimore; Jackson C. S. Yang, Silver Spring, both of Md.

[73] Assignee: Advanced Technology and Research Corporation, Burtonsville, Md.

[21] Appl. No.: 358,394

[22] Filed: Dec. 19, 1994

[51] Int. Cl.$^6$ .......................... A63B 69/00; G09B 9/00; G09B 19/00

[52] U.S. Cl. .......................... 434/247; 434/307 R; 482/5; 482/902

[58] Field of Search .................. 482/1–9, 52, 54, 482/57, 69, 137, 900–903; 434/247, 307 R; 472/118, 119, 124; 273/85 G, 148 B, 438; 73/379.01

[56] References Cited

U.S. PATENT DOCUMENTS

| | | | |
|---|---|---|---|
| 4,711,447 | 12/1987 | Mansfield | 482/902 X |
| 4,757,991 | 7/1988 | Maag | 482/137 |
| 4,790,530 | 12/1988 | Maag | 482/137 |
| 5,054,771 | 10/1991 | Mansfield | 482/5 X |
| 5,104,119 | 4/1992 | Lynch | 482/8 X |
| 5,209,662 | 5/1993 | Fujita et al. | 434/307 R X |
| 5,299,993 | 4/1994 | Habing | 482/52 |
| 5,308,296 | 5/1994 | Eckstein | 434/307 R X |
| 5,462,503 | 10/1995 | Benjamin et al. | 482/902 X |

FOREIGN PATENT DOCUMENTS

| | | | |
|---|---|---|---|
| 3218086 | 12/1983 | Germany | 482/902 |
| 3404539 | 8/1985 | Germany | 482/902 |
| 993962 | 2/1983 | U.S.S.R. | 482/902 |
| 1567226 | 5/1990 | U.S.S.R. | 434/247 |

*Primary Examiner*—Joe Cheng

[57] ABSTRACT

An exercise machine is used interactively with a video monitor and an audio loudspeaker to create a physical sensation through a 3-D environment. A recumbent exercise bicycle with an attached monitor is suspended from an outer supporting frame by utilizing a four-bar linkage. A rolling action is created by pulling individually the crank and lever of the four-bar linkage; turning action, by moving the crack and lever laterally. A pitching action is created by pushing or pulling on a handlebar mounted on the outer frame. The rate of motion through the scene is achieved by pedaling. These features provide a total full-body workout interactively with computer games.

5 Claims, 3 Drawing Sheets

VIRTUAL-REALITY BASED FLYCYCLE EXERCISE MACHINE

BACKGROUND OF THE INVENTION

This invention relates to an exercise machine for full body exercise used interactively with a video monitor to create a three-dimensional physical sensation.

Several machines have been developed in recent years that allow for a user to interact with an executing computer program in a physical manner. Many of these machines are essentially interfaces to video games: the user sits in a chair and pushes or pulls on various devices with his arms and legs to control the execution of the game. Two examples of this usage are U.S. Pat. Nos. 4,711,447 and 5,054,771. In both of these systems, the user sits on or in a mechanism that provides a turning and/or tilting action in response to his inputs. These inputs are then in turn monitored by a computer so that "a marker on a computer monitor is computer interactively engagaed with movement of the seat such that swinging motion of the seat causes the marker to selectively move up-and-down and side-to-side on a computer monitor" (U.S. Pat. No. 5,054,771). Although such a system may be sufficient for interactions with two-dimensional game, they lack the fidelity of motion that is needed for the "suspension of disbelief" that is required for motion through a three-dimensional virtual reality (VR) environment, where the feeling of "immersion" is critical.

A commercial machine—the Tectrix VRbike—addresses some of these concerns. The system provides for the actions of riding a recumbent bicycle through a VR landscape. The drawbacks of the Tectrix system are fourfold: Firstly, the turning motion is somewhat limited. To turn, the user pulls on handles that cause the seat to lean. However, since there is no capacity to adjust to the user's weight, then a lightweight user will have a considerably more difficult time in initiating or maintaining a turn than a heavy user.

Secondly, there is little lateral motion to provide the user with the physical sensation of lateral movement that is associated with turning in the real world. Thirdly, the monitor is fixed on the frame. When the user leans through the turn, he must look at the monitor (in the opposite way of the turn), which is counterintuitive and frustrating. Fourthly, the VRbike can only move through an environment that exists in a plane, i.e. the user must remain on the ground in his explorations. This limits significantly the types of environments that the system could potentially explore, for example, the undersea, airborne, or outer space, all require the ability of the user to dive or climb to move through the environment. Additionally, if the mechanism is used for teleoperation of actual, remote systems, the lack of a tilt axis would limit interaction to surface vehicles.

SUMMARY OF THE INVENTION

An object of this invention is to provide an exercise machine with a significantly enhanced capability for the user to move freely through a three-dimensional computer generated environment. Another object of this invention is to provide an exercise machine which does not compromise on spring strength needed to return the mechanism to the original position. Still another object of this invention is to provide an exercise machine which gives the user valuable physical cues that make the lean more like turning as opposed to leaning. A further object of this invention is to provide an exercise machine which has the ability to climb and dive by tilting the mechanism in the manner of a swing.

These objects are achieved in this invention by hanging what is essentially a recumbent exercise bicycle (or gondola) with an attached monitor from an outer supporting frame by utilizing a four-bar linkage. The user makes the platform, turn, climb and dive by pushing or pulling on a handlebar that is attached to the outer frame.

Since the user is suspended along with the gondola from the outer frame, the effort required to tilt or bank the system is proportional to the weight of the user. Therefore there is no compromise on spring strength needed to return the seat to the vertical position.

The four-bar linkage as incorporated in this invention provides a significant lateral motion in the process of leaning from side-to-side. This provides the user with the physical cues that make the lean feel more like turning. In this manner, the physical sensation of turning is provided solely by the combination of roll and lateral motion from the four-bar linkage and the motion of the three-dimensional graphic environment portrayed on the monitor by the graphics display system.

The monitor is mounted to the gondola, and moves with the user through the full range of the motions. The user does not have to adjust his perspective to look back at a monitor he is leaning away from.

The invention provides the ability to climb and dive by tilting the mechanism in the manner of a swing. Again, since the effort to hold a particular tilt angle is directly proportional to the weight of the user, the system is self-calibrating, without the need for additional mechanism to assist or resist the motion. The capability of climbing and intuitively correct turning allows for the invention to provide for a significantly enhanced capability for the user to move freely through a three-dimensional computer generated (or telepresence) environment.

DETAILED DESCRIPTION OF THE PREFERRED EMBODIMENT

There are three basic components of the invention:

A gondola, to which are mounted a video display, audio speakers, a drivetrain with electronically controlled loading, and a seat with seatbelt.

A platform, comprising a raised floor and two uprights, to which are mounted the gondola by an axle and four-bar linkage, and an adjustable handlebar with electronic buttons.

A computer and associated sensors and actuators, capable of determining the orientation of the gondola with respect to the platform, the rate and direction of pedaling, and responding with appropriate pedaling resistance, graphical, and audio cues.

Resistance to side-to-side and fore-and-aft motion results entirely from gravity, while resistance to pedaling is determined by the computer, and provided electronically to the drivetrain.

Based on the inputs from the user, the system provides the audio, visual and physical sensation of moving through a three-dimensional virtual environment. Based on the contraints of the environment, the user may engage in basic actions: climbing, diving, turning, landing, taking off, etc. Additionally, the user can play games in this environment, such as dogfights, races, and so forth.

Figure 1:
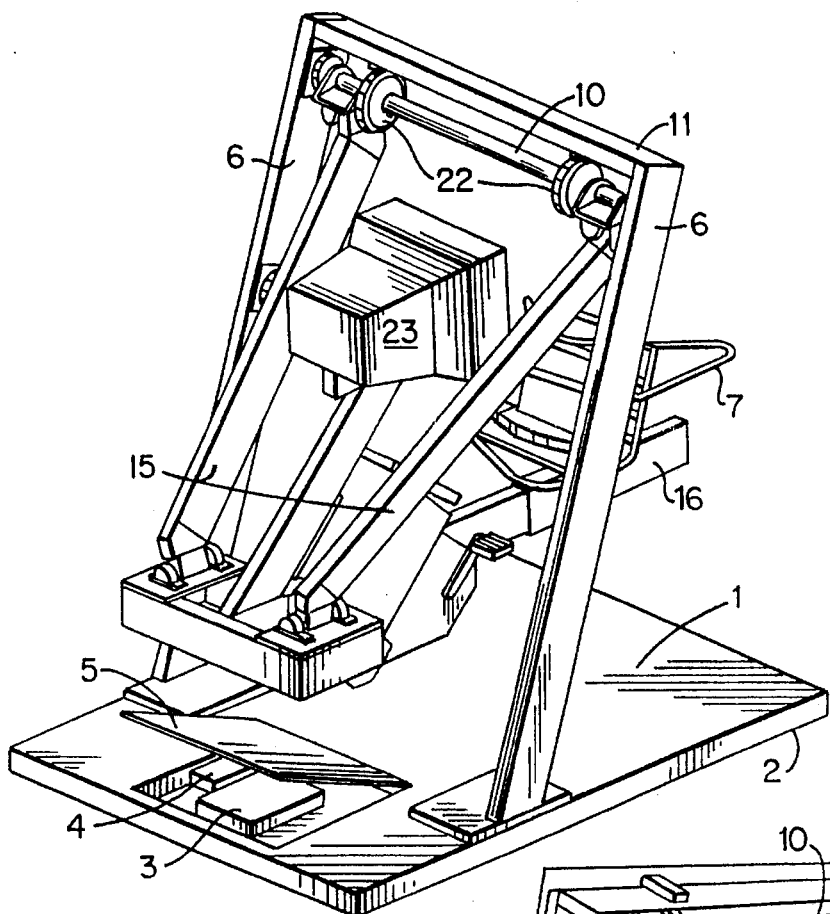
FIG. 1 shows an overall view of the entire flycycle.

As shown in FIG. 1, the base 1 rests on the floor. Leveling adjustment is provided by four leveling screw-feet 2. The base contains the computer 3 and interface electronics 4 under an access hatch 5. Rising from the platform are two supports 6.

Figure 2:
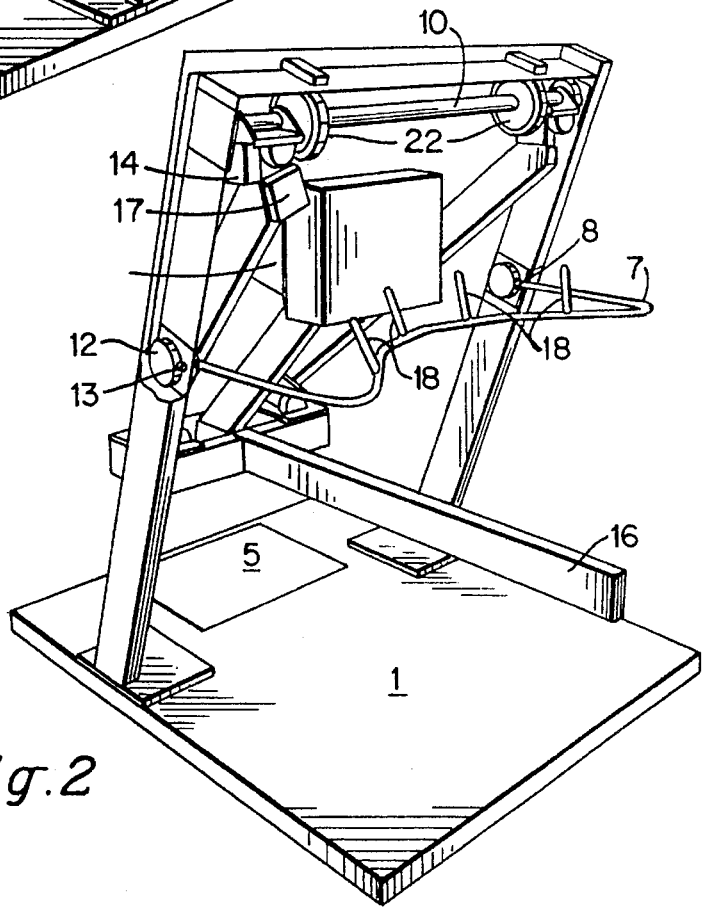
FIG. 2 shows a side view of the base, supports, and handlebar mechanism.

The handlebar 7 and the pitch axle 10 are attached to these supports as shown in FIG. 2. The handlebar is adjustable in height by rotating about its attachment point 8. The angle of the handlebar is fixed by a spring-loaded pin that is controlled by a lever on the handlebar 7. Affixed to the handlebar is a number of buttons 18 that allow the user to communicate with the computer. This may be in the form of selecting menus, firing weapons, or similar activities.

The pitch axle 10 connects the tops of the supports 6 as shown in FIG. 1. Its rotation allows the user to cause pitching action, so as to simulate climbing or diving. Brakes 22 as shown in FIG. 2 mounted to the axle and the brake support bar 11 shown in FIG. 1 keep the pitch axis locked when not in use or in a powered down state. These brakes are released by pulling down on the handlebar 7, which is attached to a ratcheting mechanism 12 shown in FIG. 2, which in turn is attached to the brakes via a cable, and are actuated when power to the brake solenoid 13 in the ratcheting mechanism is removed. The pitch inclinometer 14 is attached directly to the pitch axle and is used to provide the computer with pitch angle information.

Attached to the pitch axle at two points are the links or wings 15 shown in FIG. 1 that connect the base 1 to the gondola 16 shown in FIG. 2. These wings make up two opposite bars serving as the crank and lever of a four-bar linkage, where the other two bars are the pitch axle and the gondola 16. Since the top link has a greater span than the botton link, the gondola will "lean" in the direction that it is pulled, providing the physical sensation of turning to the user when combined with appropriate graphical display on the display monitor 23. Attached to the top of one of these wings is the roll inclinometer 17, which is used to provide the computer with roll angle information as shown in FIG. 2.

Figure 3:
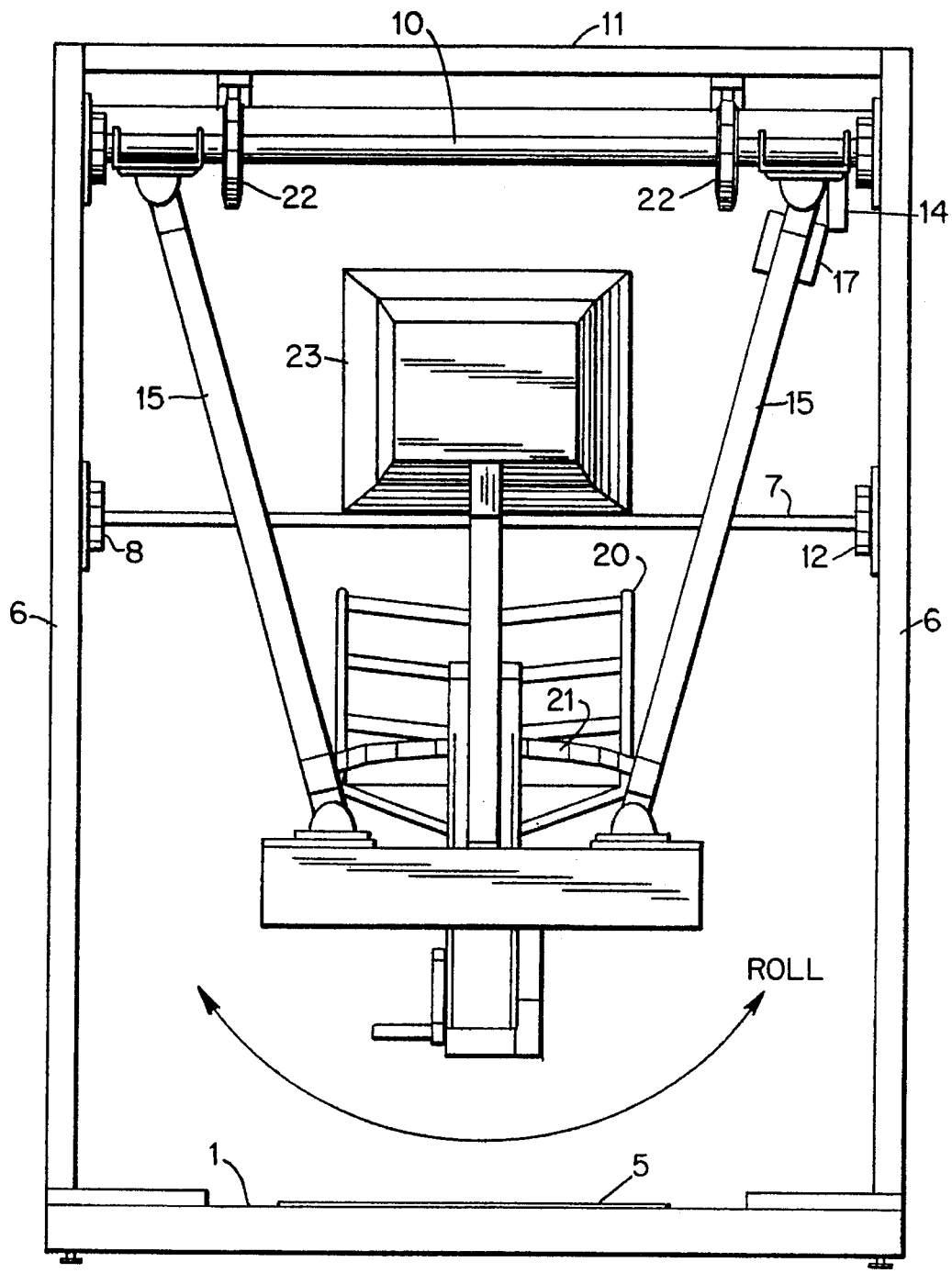
FIG. 3 shows the front view of the four-bar linkage to effect the roll function.
Figure 4:
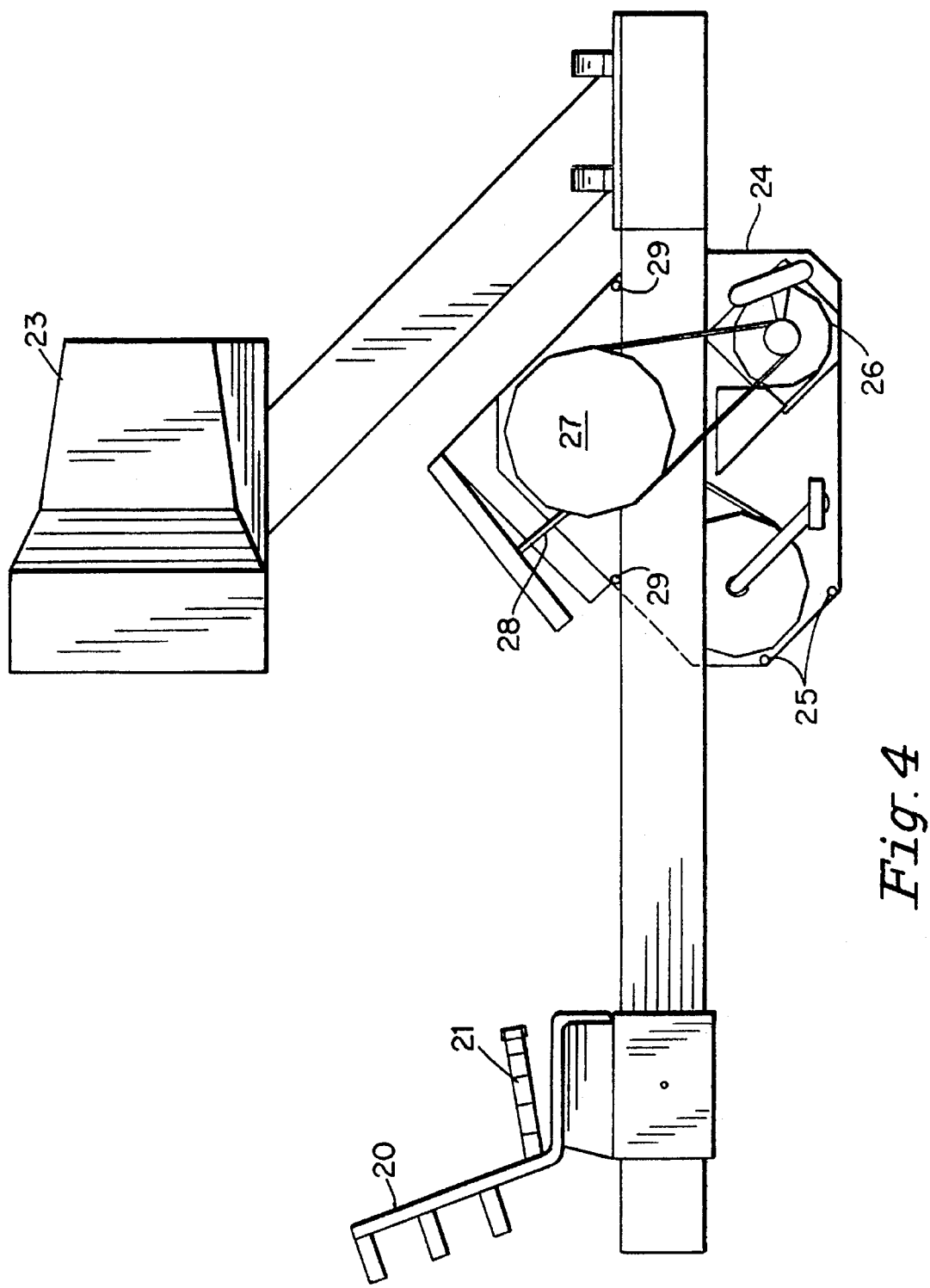
FIG. 4 shows a cutaway side view of the gondola, set, monitor, drivetrain and fairing.

The user sits on the gondola 16 through the use of a seat 20 which is mounted to the gondola with a locking sleeve as shown in FIG. 4. The gondola is normally locked with respect to pitch. For the user to move the gondola, the brakes holding the gondola in position must be released. For the brakes to release, the seat belt 21 shown in FIG. 4 must be engaged. This applies power to the brake solenoid 13 shown in FIG. 2, which in turn engages the ratcheting mechanism that pulls the brakes 22 away from the pitch axle 10 in FIG. 1. Pitch is changed by pushing or pulling on the handlebar. Roll is effected by pushing or pulling on one side or the other of the handlebar as shown in FIG. 3.

The user views the 3-D scene presented by the computer on a monitor 23 shown in FIG. 1 that is mounted to the gondola frame. In this way, the monitor moves with the user through changes in orientation.

To provide the sensation of motion, the user engages a pedaling mechanism as shown in FIG. 4. The mechanism, or drivetrain 24 includes sensors 25 for determining speed and direction of the pedaling motion and speed, and includes an alternator 26, 27 for providing resistance to the pedaling motion. Since the alternator is most efficient at approximately 100 rpm and human pedaling is generally between 60 and 129 rpm, the entire drivetrain is adjustable fore and aft on the gondola. To adjust the drivetrain to accommodate persons of varying leg length, the user pulls up on a spring-loaded pin 28 by using the handle. The pin/handle mechanism is attached to a solid shaft which is in turn securely attached to the drivetrain. To lock the drivetrain in place, the pin is placed into one of a number of locking holes which are drilled into the gondola. The drivetrain moves freely for and aft on a set of wheels 29, which also lock the drivetrain onto the gondola.

To further provide the physical sensation of motion, an audio loudspeaker is mounted to the gondola. The loudspeaker can simulate the sound of speed, mechanism, action, etc.

Although the system as described utilizes a video monitor to display the images, a helmet-based viewing system could be easiliy substituted for added effect.

What is claimed is:

1. An exercise machine for providing motion in three dimensions through the use of a four-bar linkage to generate the sensation of motion through a three dimensional computer generated virtual environment, comprising:

a frame which is stationary and fixed to a platform;

a gondola suspended in said frame by a four-bar linkage, such that roll and lateral motion of said gondola provided by said four-bar linkage generates the sensation of banked turning and the pitch angle resulting from pendular rotation of said gondola about the points of suspension of said gondola from said frame so as to generate the sensation of climbing and diving through a three-dimensional computer generated virtual environment;

a seat mounted onto said gondola and fixed on a coupling link of said four-bar linkage;

a pedal-operated drive train having a pair of pedals mounted on said coupling link in front of said seat with which a user controls simulated speed in said computer generated virtual environment through the rate of rotational pedaling by said user, thereby generating the sensation of motion;

a stationary handlebar means fixed to said frame with which said user exercise upper body strength through the arms and hands by pulling and pushing against the gravitational weight of said user and said gondola to achieve and to hold the desired bank right or left and the desired pitch angle up or down in a coordinated manner to control the direction of a simulated three-dimensional movement in said computer generated virtual environment; and a video monitor fixed on said coupling link of said four-bar linkage of said gondola in front of said seat for said user to view said computer generated virtual environment.

2. An exercise machine as described in claim 1, wherein said video monitor provides a scene of said computer-generated virtual environment which moves in a direction controlled by the roll and pitch angles generated by said user and at a rate controlled by the rate of pedaling by said user, thereby creating the sensation of three-dimensional movement in said computer-generated virtual environment.

3. An exercise machine as described in claim 1 further comprises braking means having braking mechanism for braking said gondola when said exercise machine is not in use, and when said user rotates said pedal of said pedal-operated drive train to release said braking mechanism of said braking means.

4. An exercise machine as described in claim 1, wherein said pedal-operated drive train further includes sensor means for determining the speed and direction of motion of said pedals of said pedal-operated drive train, and an alternator for providing resistance to said speed and direction of motion.

5. An exercise machine as described in claim 4, wherein said alternator is connected to said pedals by reduction gears.

\* \* \* \* \*